United States Patent
Benjamin-Deckert et al.

(10) Patent No.: US 9,710,479 B2
(45) Date of Patent: Jul. 18, 2017

(54) PROVIDING RECORD-LEVEL ALTERNATE-INDEX UPGRADE LOCKING

(71) Applicant: International Business Machines Corporation, Armonk, NY (US)

(72) Inventors: Debra J. Benjamin-Deckert, San Jose, CA (US); Lawrence L. Law, Saratoga, CA (US); Terri A. Menendez, Richmond, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/703,820

(22) Filed: May 4, 2015

(65) Prior Publication Data

US 2015/0234858 A1  Aug. 20, 2015

Related U.S. Application Data

(63) Continuation of application No. 13/842,117, filed on Mar. 15, 2013, now Pat. No. 9,043,295.

(51) Int. Cl.
   *G06F 17/30* (2006.01)

(52) U.S. Cl.
   CPC .. *G06F 17/30171* (2013.01); *G06F 17/30233* (2013.01); *G06F 17/30345* (2013.01)

(58) Field of Classification Search
   CPC .................. G06F 17/30952; G06F 17/30171
   USPC ........................................................ 707/696
   See application file for complete search history.

(56) References Cited

U.S. PATENT DOCUMENTS

| | | | |
|---|---|---|---|
| 4,855,907 A * | 8/1989 | Ferro, Jr. ........... | G06F 17/30952 |
| 5,168,444 A | 12/1992 | Cukor et al. | |
| 7,996,408 B2 | 8/2011 | Chauvet et al. | |
| 8,195,702 B2 * | 6/2012 | Shankar ............ | G06F 17/30336 |
| | | | 707/792 |
| 9,043,295 B2 | 5/2015 | Benjamin-Deckert et al. | |
| 2005/0182776 A1* | 8/2005 | Yennie ............. | G06F 17/30327 |
| 2009/0276430 A1 | 11/2009 | Bruso et al. | |
| 2012/0096055 A1 | 4/2012 | Lee et al. | |
| 2014/0279983 A1 | 9/2014 | Benjamin-Deckert et al. | |

OTHER PUBLICATIONS

Benjamin-Deckert et al., U.S. Appl. No. 13/842,117, filed Mar. 15, 2013.
Notice of Allowance from U.S. Appl. No. 13/842,117, dated Jan. 20, 2014.

* cited by examiner

*Primary Examiner* — Belix M Ortiz Ditren
(74) *Attorney, Agent, or Firm* — Zilka-Kotab, P.C.

(57) ABSTRACT

In one embodiment, a method includes receiving a request to perform an update on a base data set in a record-oriented file system, wherein one or more affected records within the base data set are modified by the update. Affected alternate index (AIX) records corresponding to the affected records are located, and individual record-level locks are acquired on each affected AIX record. Each of the affected AIX records is updated according to the update after acquiring the individual record-level locks on each of the affected AIX records.

19 Claims, 5 Drawing Sheets

PROVIDING RECORD-LEVEL ALTERNATE-INDEX UPGRADE LOCKING

RELATED APPLICATIONS

This application is a continuation of U.S. patent application Ser. No. 13/842,117, filed Mar. 15, 2013, which is herein incorporated by reference.

BACKGROUND

The present invention relates to data center management and file systems, and more specifically, this invention relates to locking at the record level of a record-oriented file structure to ensure data integrity when performing operations to data records.

File systems which allow direct and sequential accesses to data stored therein typically utilize a B+ tree structure which is a variation of the basic B tree structure with all terminal nodes thereof containing data records. The non-terminal nodes of the B+ tree structure are referred to as an index structure. The top of the B+ tree structure is a single node referred to as the root. The B+ tree structure is a balanced tree with all the terminal nodes at the same level such that all data records stored therein have the same or substantially the same search length. The effectiveness and the popularity of the B+ tree structure may be attributable to the shape of the tree. The B+ tree tends to be short and wide, referred to typically as "flat," e.g., it has few hierarchical levels and many nodes at each level.

The B+ tree structure has become somewhat of a standard for organization of files. Many database systems (relational or otherwise) and general-purpose access methods, such as virtual storage access method (VSAM), are designed using the B+ tree structure. The VSAM includes some additional features over other typical access methods, such as key compression. For ease of discussion, and due to the fact that VSAM was one of the first commercial products in the world that used the B+ tree structure, VSAM terminology may be used in the descriptions provided, but the descriptions are not limited to VSAM alone, as any access method may be used in relation to a B+ tree structure.

Virtual storage access method (VSAM) is a disk file storage access method used in IBM z/OS environments. VSAM data sets include multiple records, and the data sets are of fixed or variable length, and are organized into fixed-size blocks called Control Intervals (CIs). The CIs are then organized into larger groups referred to as Control Areas (CAs). CIs are used as units of transfer between direct access storage devices (DASDs) and requesting systems such that a read request will read one complete CI. CAs are used as units of allocation, such that when a VSAM data set is defined, an integral number of CAs will be allocated for that VSAM data set.

With key sequenced data sets (KSDSs), the contents consist of the users data and a unique key (specified by the user) which is used to locate specific data records in the data set. Each record in a KSDS has one unique key. Entry sequenced data sets (ESDSs) on the other hand, only contain user data, and the user provides the relative byte address (RBA) of the location of the specific data records for the VSAM to locate. The VSAM data sets containing the user data are referred to as the "base" data sets. The following is an example of user data which could be located in a KSDS or ESDS. In this example, a base data set named "MY.BASE.DS" includes an account number, name, and address, where the account number is specified by the user as the unique key for the KSDS, as shown in Table 1.

TABLE 1

MY.BASE.DS

| RBA | Unique Key Account Number | Data Field Name | Data Field Address |
|---|---|---|---|
| 0 | 1234 | John Smith | 13 Main St., San Jose, CA |
| 4096 | 5678 | Jane Doe | 26 First St., San Francisco, CA |
| 8192 | 9ABC | John Smith | 111 Beach St., Santa Cruz, CA |

In order to locate each of the three records in the above data set, the unique keys in the Account Number field may be used for a KSDS, and the RBA values for an ESDS.

VSAM also allows the user to locate the data records in the base data sets via different (or alternate) key fields than the base key. This is accomplished by defining another (alternate) KSDS which is built over the base data sets. The alternate KSDS is referred to as an Alternate Index (AIX). The base data set may be a KSDS or an ESDS. The record key in the base KSDS is called the primary key; the key in an AIX is an alternate key. For example, using the above base data set MY.BASE.DS as an example, two AIXs may be defined with separate alternate keys for the Name and Address fields, respectively. For each AIX, a Path entry is defined to relate the specific AIX to the base. For example, reference is made to Table 2.

TABLE 2

Path Entries

| Pathname | AIX Name | AIX Key Field | Base Name |
|---|---|---|---|
| MY.PATH1 | MY.AIX1.DS | Name | MY.BASE.DS |
| MY.PATH2 | MY.AIX2.DS | Address | MY.BASE.DS |

The contents of the AIX KSDS may include the following records in this example, as shown in Tables 3 and 4.

TABLE 3

MY.AIX1.DS

| Alternate Key | RBA(s) |
|---|---|
| John Smith | 0, 8192 |
| Jane Doe | 4096 |

TABLE 4

MY.AIX2.DS

| Alternate Key | RBA(s) |
|---|---|
| 13 Main St., San Jose, CA | 0 |
| 26 First St., San Francisco, CA | 4096 |
| 111 Beach St., Santa Cruz, CA | 8192 |

The user may now access the data records in the base data set, MY.BASE.DS, via the path entries. For example, when using MY.PATH1, the user may supply the person's name and VSAM will return matching base records. If a name of 'John Smith' is provided, VSAM will return both of the John Smith records in the base data set. When using MY.PATH2, the user may supply an address, and VSAM will return any record matching the specified address. Whenever the base records are updated, added, and/or deleted, the AIX data sets are also updated. Together, the AIX data sets are referred to as the "upgrade set." This is because the AIXs are updated together whenever the user updates the base records.

When VSAM updates the upgrade set, the entire set of KSDS AIXs are locked, allowing only one update to occur at a time. This lock is referred to as the "upgrade lock." Holding an upgrade level lock results in severe performance problems whenever the base data set is modified. It would be beneficial to avoid these severe performance problems from occurring during updates to the upgrade set.

Some attempts have been made to address this issue, including using application logic to avoid the use of VSAM AIXs and using relational data base managers (e.g., DB2) to build tables relating the different fields in the user data. One disadvantage of the first approach is the cost to develop and maintain unique application code. Some disadvantages of using a relational database manager include the cost to migrate existing VSAM applications over to use the database manager, the processor and performance overhead associated with database managers, and requiring a different skill set for the user in order to operate the relational database manager.

SUMMARY

In one embodiment, a method includes receiving a request to perform an update on a base data set in a record-oriented file system, wherein one or more affected records within the base data set are modified by the update. Affected alternate index (AIX) records corresponding to the affected records are located, and individual record-level locks are acquired on each affected AIX record. Each of the affected AIX records is updated according to the update after acquiring the individual record-level locks on each of the affected AIX records.

A computer program product for updating alternate index (AIX) records includes a computer readable storage medium having program instructions embodied therewith. The program instructions are readable/executable by a computer to cause the computer to receive, using the computer, a request to perform an update on a base data set in a record-oriented file system, wherein one or more affected records within the base data set are modified by the update. The program instructions are also readable/executable by the computer to cause the computer to locate, using the computer, affected AIX records corresponding to the affected records. The program instructions are also readable/executable by the computer to cause the computer to acquire, using the computer, individual record-level locks on each affected AIX record. The program instructions are also readable/executable by the computer to cause the computer to update, using the computer, each of the affected AIX records according to the update after acquiring the individual record-level locks on each of the affected AIX records.

A system according to one embodiment includes a processing circuit and logic that is at least one of integrated and executable by the processing circuit. The logic is configured to cause the processing circuit to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
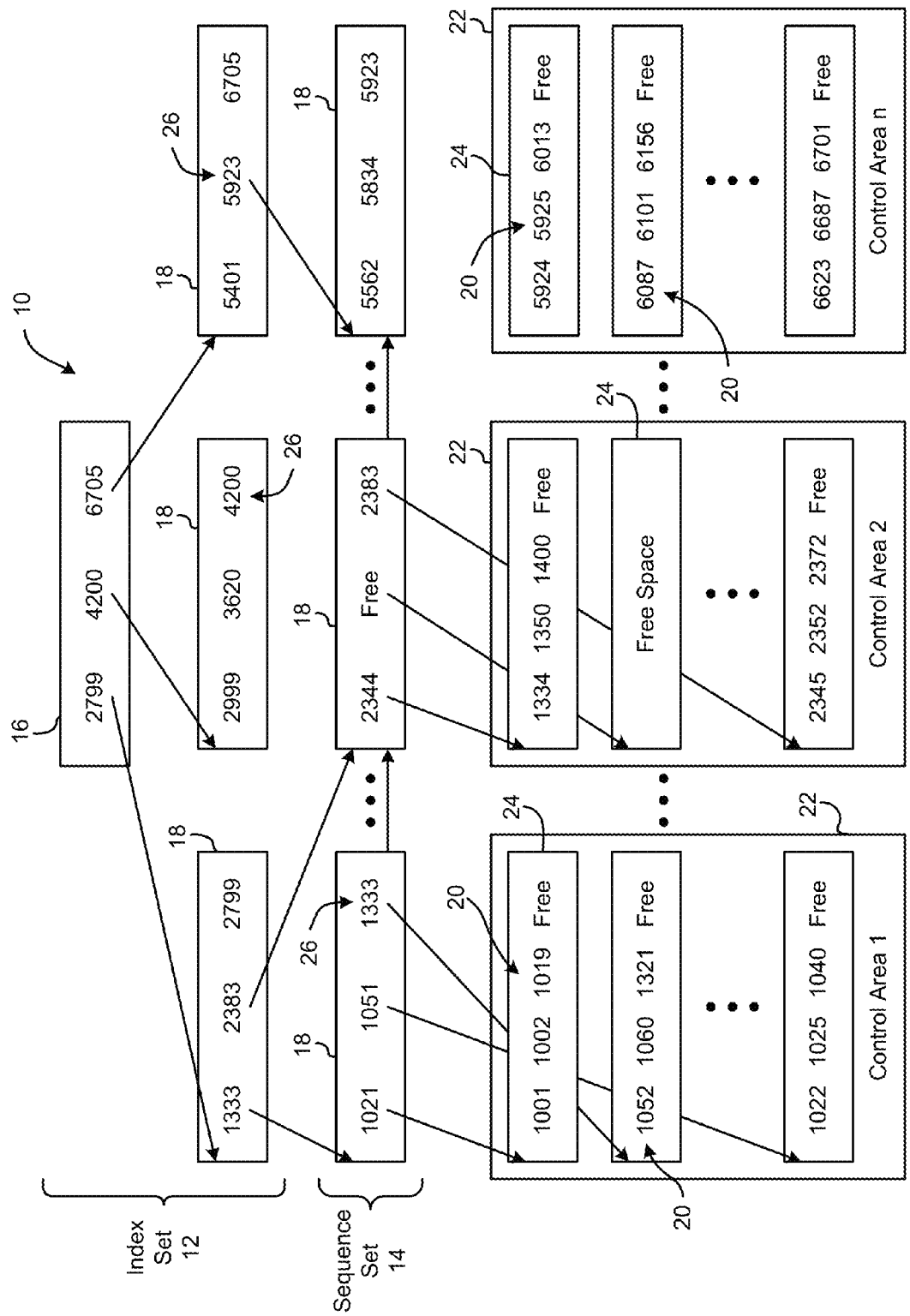
FIG. 1 illustrates a B+ tree structure in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

As a high level overview of various embodiments of the present invention, record-level locking of one or more alternate index (AIX) may be provided in a tree structure file system, such as a file system utilizing virtual storage access method (VSAM) in IBM z/OS environments, in order to only lock those AIX records involved in an update process. Accordingly, updates of the unlocked (unaffected) records may be performed in parallel with the updates to the locked (affected) records. This in turn substantially increases the performance of the file system.

In one general embodiment, a system includes a processor and logic integrated with and/or executable by the processor, the logic being adapted to: receive a request to perform an update on a base data set in a record-oriented file system, wherein one or more affected records within the base data set are modified by the update; locate all AIX records for the base data set, each AIX record including an alternate key field along with one or more relative byte address (RBA) values when the base data set is an entry sequenced data set (ESDS), or one or more primary keys when the base data set is a key sequenced data set (KSDS), wherein each RBA value/primary key corresponds to one record in the base data set; acquire, using the processor, individual record-level locks on each affected AIX record that includes alternate key field values and/or RBA values that are modified by the update; and update each of the affected AIX records according to the update after acquiring the individual record-level locks on each of the affected AIX records.

In another general embodiment, a computer program product for updating AIX records includes a computer readable storage medium having program code embodied therewith, the program code readable/executable by a processor to: receive, using the processor, a request to perform an update on a base data set in a record-oriented file system, wherein one or more affected records within the base data set are modified by the update; locate, using the processor, all AIX records for the base data set, each AIX record including an alternate key field along with one or more RBA values when the base data set is an ESDS, or one or more primary keys when the base data set is a KSDS, wherein each RBA value/primary key corresponds to one record in the base data set; acquire, using the processor, individual record-level locks on each affected AIX record that includes alternate key field values and/or RBA values that are modified by the update; and update, using the processor, each of the affected AIX records according to the update after acquiring the individual record-level locks on each of the affected AIX records.

In another general embodiment, a method for updating AIX records includes receiving a request to perform an update on a base data set in a record-oriented file system, wherein one or more affected records within the base data set are modified by the update; locating all AIX records for the base data set, each AIX record including an alternate key field along with one or more RBA values when the base data set is an ESDS, or one or more primary keys when the base data set is a KSDS, wherein each RBA value/primary key corresponds to one record in the base data set; acquiring individual record-level locks on each affected AIX record that includes alternate key field values and/or RBA values that are modified by the update; updating each of the affected AIX records according to the update after acquiring the individual record-level locks on each of the affected AIX records; and relinquishing the individual record-level locks on the affected AIX records after updating the affected AIX records. The file system is a VSAM system, the AIX is defined over an ESDS or a KSDS, and with the proviso that an upgrade lock is not acquired for all of the AIX records for the base data set.

For ease of discussion, and due to the fact that VSAM was one of the first commercial products in the world that used the B+ tree structure, VSAM terminology may be used in the descriptions provided herein. However, the embodiments described herein are not limited to a system which uses VSAM, as any record-oriented file system, such as a B+ tree, key sequenced data set (KSDS), entry sequenced data set (ESDS), relative record data set (RRDS), variable-length RRDS (VRRDS), etc., may be used with any of the embodiments described herein. The file system may or may not utilize a nonlinear data set structure.

A file structure of a data set 10 is shown in FIG. 1 which includes two parts, the 'sequence set' 14 and the 'index set' 12. The index set 12 includes the root 16, along with a plurality of index nodes 18. The terminal nodes of the file structure of the data set 10 are keyed data records 20 which are organized into one or more data control intervals (CIs) 24. Above the data CIs 24 are one or more data control areas (CAs) 22, with each data CA 22 being capable of organizing a plurality of data CIs 24. Each node 18 in the index set 12 is an index CI, which includes one or more index records 26.

In the file structure of the exemplary data set 10 shown in FIG. 1, each data CA 22 includes three data CIs 24, but any number may be included according to storage and search requirements of a particular user of the file system. In addition, as shown in FIG. 1, each data CIs 24 includes three data records 20, but any number may be included according to storage and search requirements of a particular user of the file system.

According to one embodiment, record-oriented file systems, such as those utilizing VSAM, may be enhanced by incorporating record-level locking to create AIX record-level locks along with existing base data set record locks currently in use. The AIX record-level locks may be obtained as shared or exclusive locks whenever the base data set records are referenced. One great advantage of this method of locking at the record-level for AIXs would be to give all users of the VSAM file system substantial performance improvements when using AIXs, and to allow existing and new VSAM applications more flexibility when referencing data records by no longer requiring migration to a database manager.

The AIX record-level locks may include a resource name comprising a hash. In one embodiment, the hash may be a x'16' byte key value appended to the "magic name." The magic name is a generated x'16' byte identifier that represents an individual data set. The magic name may be stored in another lock or index which associates the actual data set name to the magic name.

When an update or read access is issued, either via a path entry or via the base data set, the record-level locks are obtained for both the base data set record and the AIX records. The record-level locks for the AIX records are released at the end of the request, while the base data set lock is released or held depending on recoverability of the data set.

Figure 2:
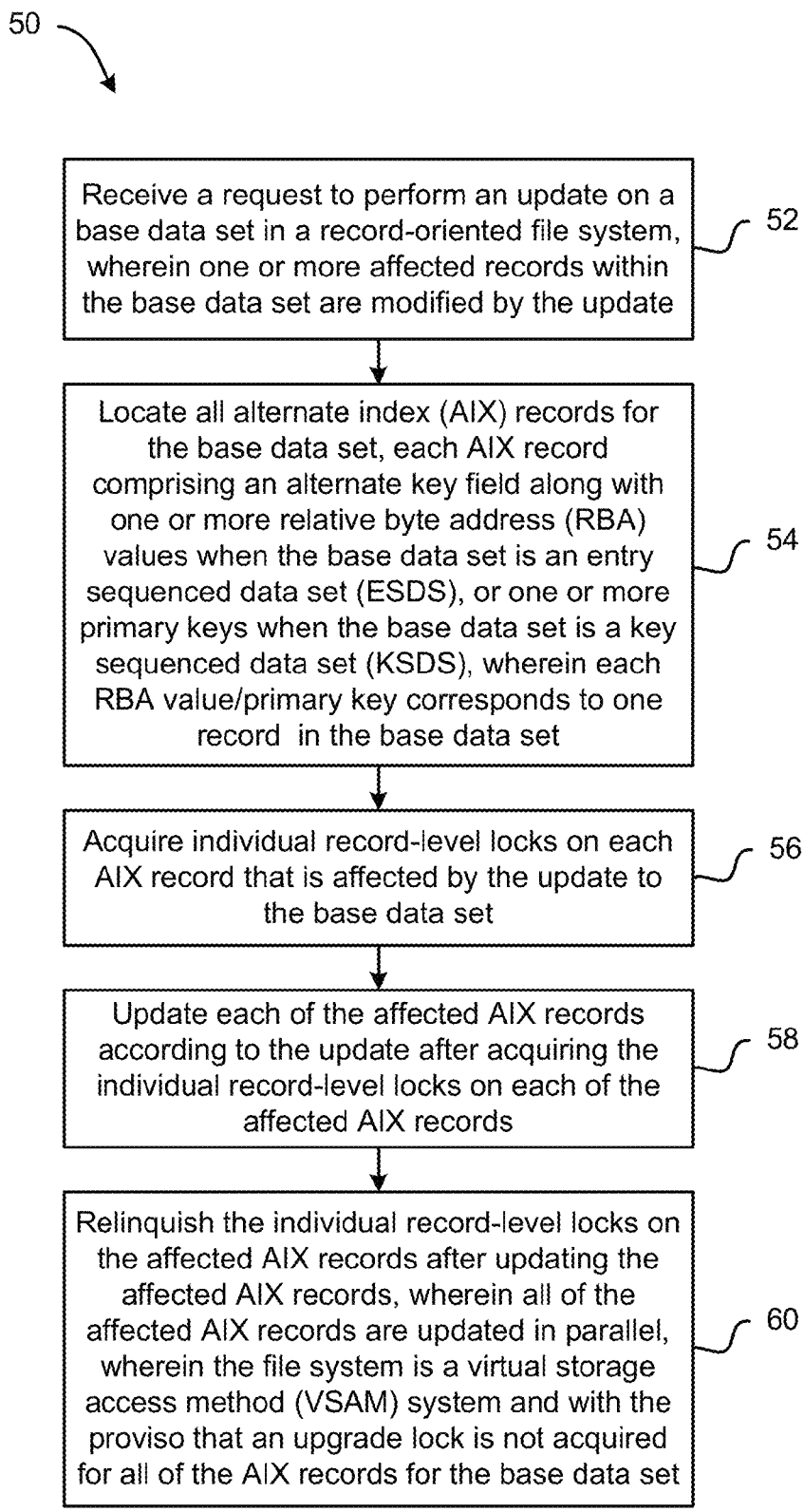
FIG. 2 is a flowchart of a method, according to one embodiment.

Now referring to FIG. 2, a flowchart of a method 50 for updating AIX records is shown, according to one embodiment. The method 50 may be performed in accordance with the present invention in any of the environments depicted in FIGS. 1 and 3-5, among others, in various embodiments. Of course, more or less operations than those specifically described in FIG. 2 may be included in method 50, as would be understood by one of skill in the art upon reading the present descriptions.

Each of the steps of the method 50 may be performed by any suitable component of the operating environment. For example, in one embodiment, the method 50 may be partially or entirely performed by a mainframe in an IBM z/OS environment, in one approach, by a data storage system, a file system controller, a tiered data storage system controller, a processor (such as a CPU, an ASIC, an FPGA, etc.), a server, etc., or any other suitable device or component of a data storage system.

Optional operations described below are those operations which may be omitted, may be performed once while other operations are performed multiple times or vice versa, may be performed by other entities or systems and relied upon by other operations, etc., according to various embodiments.

As shown in FIG. 2, method 50 may initiate with operation 52, where a request is received to perform an update on a base data set in a record-oriented file system. One or more affected records within the base data set are modified by the update as determined by the fields which the AIX records store. For example, if a name is changed in the base data set, any AIX record which references names will also be changed per the update.

In operation 54, all AIX records for the base data set are located and/or determined. Each AIX record includes an alternate key field along with one or more RBA values when the base data set is an ESDS, or one or more primary keys when the base data set is a KSDS. Each RBA value/primary key corresponds to one record in the base data set.

In operation 56, individual record-level locks are acquired on each AIX record that is affected by the update to the base data set. Any method of acquiring the record-level locks may be used as known in the art.

In operation 58, each of the affected AIX records are updated and/or modified according to the update after acquiring the individual record-level locks on each of the affected AIX records. In this way, because only the affected AIX records are locked, the affected AIX records may be updated in parallel or substantially in parallel with unaffected AIX records, which in turn results in a great increase in the speed at which the updates may occur, as well as reducing latency.

In operation 60, the individual record-level locks are relinquished on the affected AIX records after updating the affected AIX records. Any method of relinquishing the locks may be used as known in the art.

The method 50 is performed with the proviso that an upgrade lock is not acquired for all of the AIX records for the base data set, that is, record-level locks are acquired for each individual AIX record, instead of an overall upgrade lock on all of the AIX records for the base data set, as is done conventionally.

The file system may be a VSAM system, and the AIX may be defined over a KSDS or a ESDS, in various approaches.

In one embodiment, the record-level locks on affected AIX records may be held only during updating of the affected AIX records, thereby freeing the AIX records up for use and/or more updating in a more expedited manner.

In another embodiment, the method 50 may further include acquiring a lock on the base data set prior to updating the base data set, acquiring a lock on the ESDS or the KSDS for the base data set when the individual record-level locks are acquired on the affected AIX records, and serializing updates to the base data set with updates on the affected AIX records. In this way, the base data set and the ESDS sequenced to the base data set or the KSDS keyed to that base data set may be updated as well, and the I/O for the base data set and the updated AIX records may be chained together to further improve consistency of the updating process.

In more approaches, a computer program product and a system may be provided which perform some or all of the functionality of method 50. For example, a system may comprise a processor (such as a CPU, FPGA, ASIC, etc.) and logic integrated with and/or executable by the processor (the logic possibly being hardware, software, or a combination thereof), the logic being adapted to: receive a request to perform an update on a base data set in a record-oriented file system, wherein one or more affected records within the base data set are modified by the update; locate all AIX records for the base data set, each AIX record comprising an alternate key field along with one or more RBA values when the base data set is an ESDS, or one or more primary keys when the base data set is a KSDS, wherein each RBA value/primary key corresponds to one record in the base data set; acquire, using the processor, individual record-level locks on each AIX record that is affected by the update to the base data set; and update each of the affected AIX records according to the update after acquiring the individual record-level locks on each of the affected AIX records.

In another approach, a computer program product for updating AIX records may comprise a computer readable storage medium having program code embodied therewith. The program code is readable/executable by a processor to: receive, using the processor, a request to perform an update on a base data set in a record-oriented file system, wherein one or more affected records within the base data set are modified by the update; locate, using the processor, all AIX records for the base data set, each AIX record comprising an alternate key field along with one or more RBA values when the base data set is an ESDS, or one or more primary keys when the base data set is a KSDS, wherein each RBA value/primary key corresponds to one record in the base data set; acquire, using the processor, individual record-level locks on each AIX record that is affected by the update to the base data set; and update, using the processor, each of the affected AIX records according to the update after acquiring the individual record-level locks on each of the affected AIX records.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
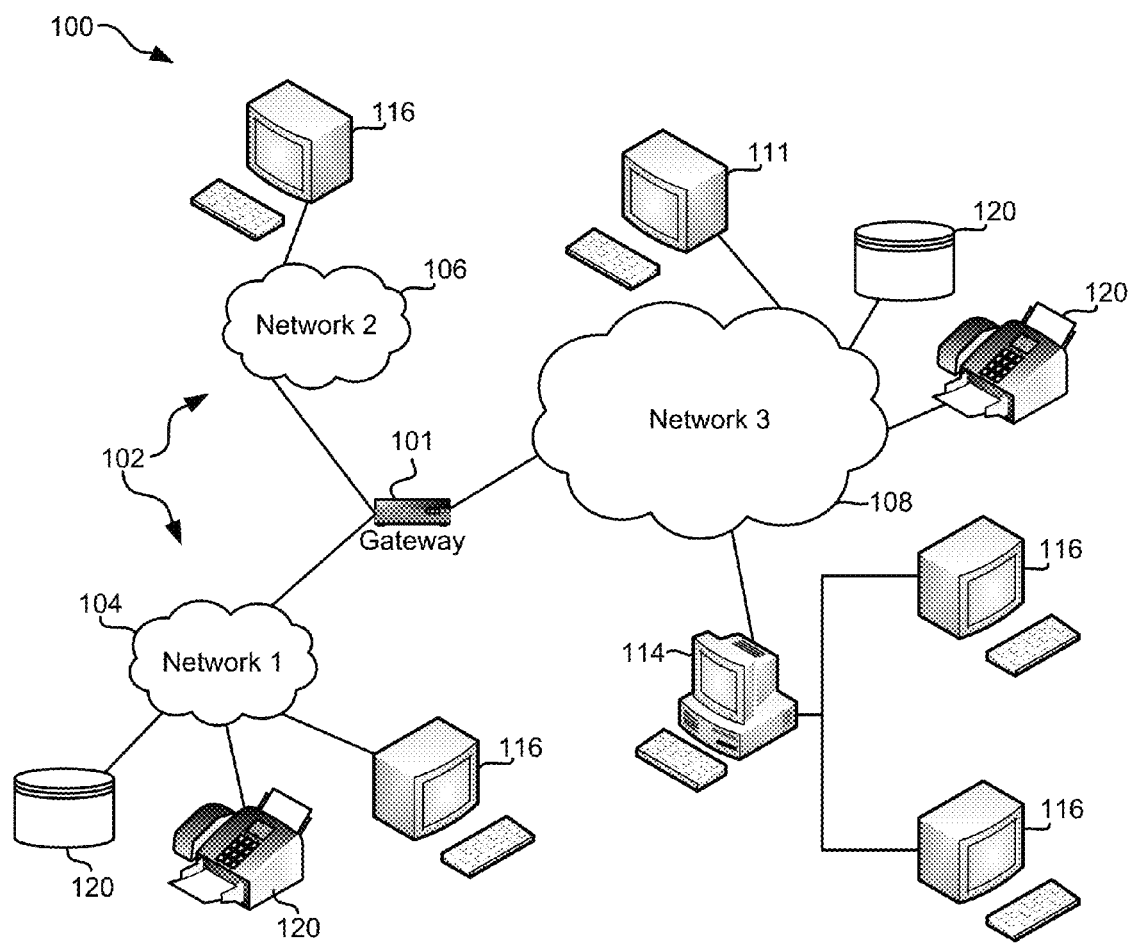
FIG. 3 illustrates a network architecture, in accordance with one embodiment.

FIG. 3 illustrates a network architecture 100, in accordance with one embodiment. As shown in FIG. 3, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 4:
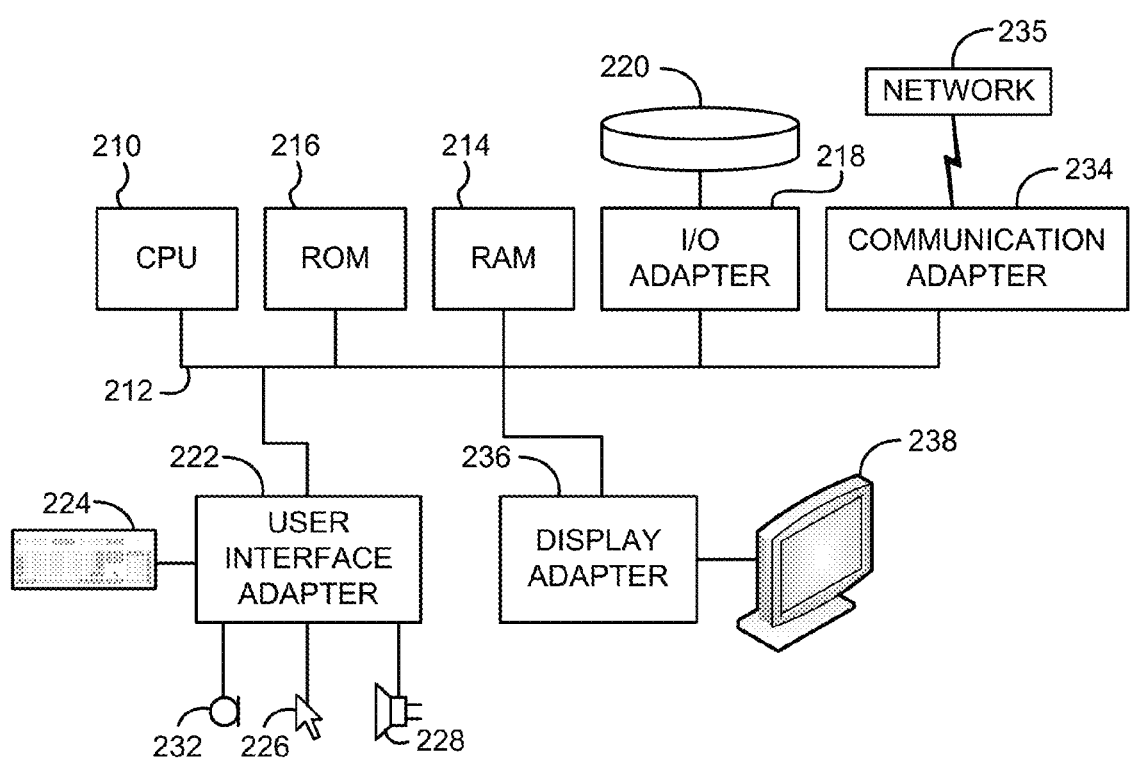
FIG. 4 shows a representative hardware environment that may be associated with the servers and/or clients of FIG. 3, in accordance with one embodiment.

FIG. 4 shows a representative hardware environment associated with a user device 116 and/or server 114 of FIG. 3, in accordance with one embodiment. FIG. 4 illustrates a typical hardware configuration of a workstation having a central processing unit 210, such as a microprocessor, and a number of other units interconnected via a system bus 212, according to one embodiment.

The workstation shown in FIG. 4 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 5:
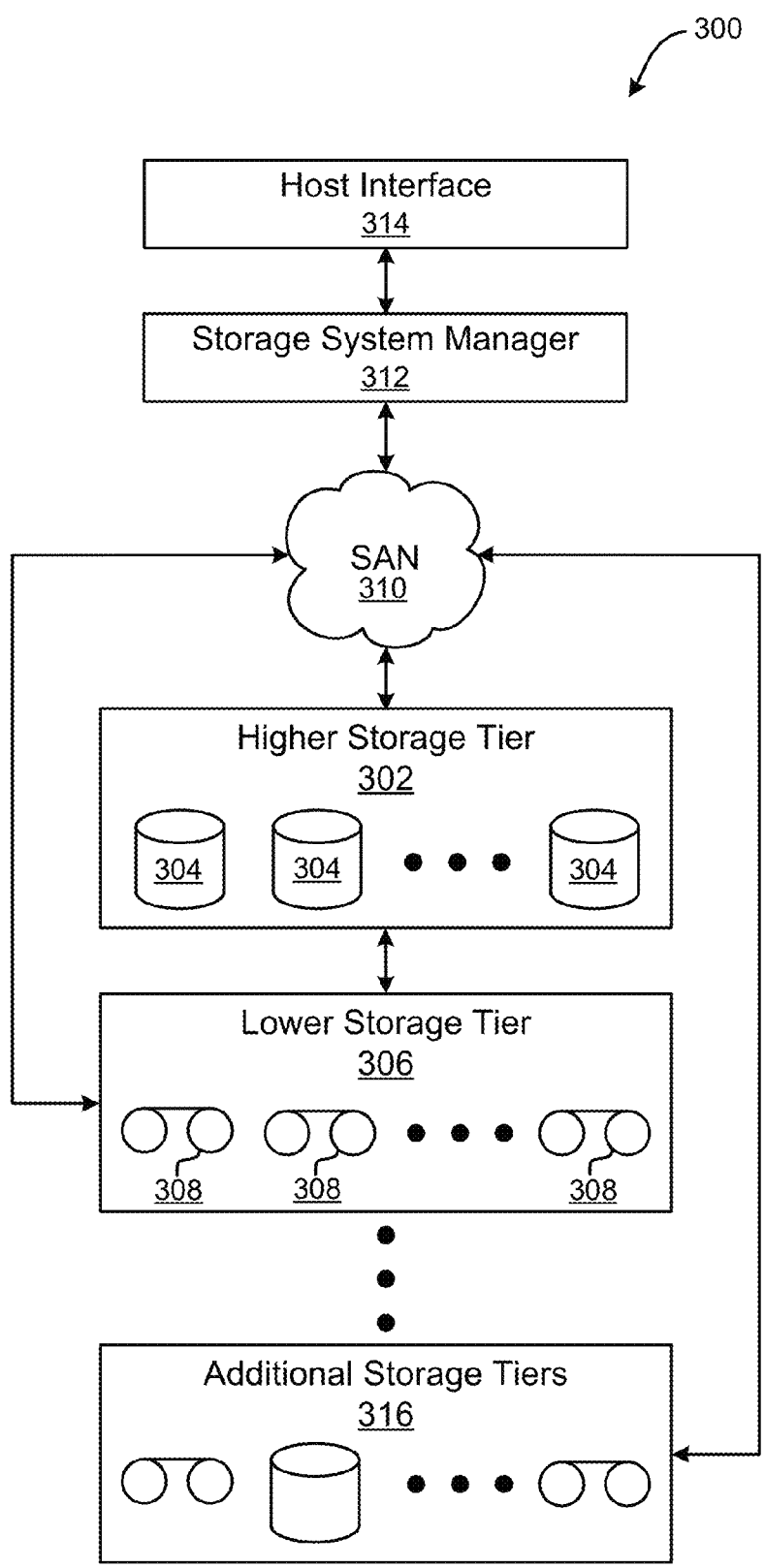
FIG. 5 is a simplified block diagram of a data storage system, according to one embodiment.

Now referring to FIG. 5, a storage system 300 is shown according to one embodiment. Note that some of the elements shown in FIG. 5 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 5. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
receiving a request to perform an update on a base data set in a record-oriented file system, wherein one or more affected records within the base data set are modified by the update;
locating affected alternate index (AIX) records corresponding to the affected records;
acquiring individual record-level locks on each affected AIX record;
holding the individual record-level locks on each of the affected AIX records only during updating of the affected AIX records; and
updating each of the affected AIX records according to the update after acquiring the individual record-level locks on each of the affected AIX records,
wherein the affected AIX records are updated in parallel with updating of unaffected AIX records, and
wherein the individual record-level locks on each of the affected AIX records each include a resource name comprising a x '16' byte key value hash.

2. The method as recited in claim 1, wherein the file system is a virtual storage access method (VSAM) system, and wherein the AIX is defined over an entry sequenced data set (ESDS).

3. The method as recited in claim 1, comprising updating unaffected AIX records in parallel with the updating of the affected AIX records, wherein individual record-level locks are not acquired for all AIX records included in the base data set, and wherein an overall upgrade lock is not acquired on all AIX records included in the base data set.

4. The method as recited in claim 1, comprising obtaining a record-level lock for the base data set prior to updating the base data set, wherein input/output (I/O) for the base data set and the affected AIX records are chained together, wherein a key sequenced data set (KSDS) provides an index for the base data set, and wherein the KSDS is keyed to a different field of the base data set than the AIX.

5. The method as recited in claim 1, comprising relinquishing the individual record-level locks on all of the affected AIX records after updating of the affected AIX records is complete.

6. The method as recited in claim 1, comprising relinquishing a first record-level lock on a first affected AIX record after updating of the first affected AIX record is complete.

7. The method as recited in claim 1, comprising:
acquiring a lock on the base data set prior to updating the base data set;
acquiring a lock on an entry sequenced data set (ESDS) for the base data set when the individual record-level locks are acquired on the affected AIX records; and
serializing updates to the base data set with updates on the affected AIX records.

8. The method as recited in claim 1, wherein at least some of the AIX records include an alternate key field along with one or more relative byte address (RBA) values when the base data set is an entry sequenced data set (ESDS), wherein each RBA value corresponds to a record in the base data set.

9. The method as recited in claim 1, wherein at least some of the AIX records include one or more primary keys when the base data set is a key sequenced data set (KSDS), wherein each primary key corresponds to a record in the base data set.

10. A computer program product for updating alternate index (AIX) records, the computer program product comprising a computer readable storage medium having program instructions embodied therewith, the program instructions being at least one of readable and executable by a computer to cause the computer to:
receive, using the computer, a request to perform an update on a base data set in a record-oriented file system, wherein one or more affected records within the base data set are modified by the update;

locate, using the computer, affected AIX records corresponding to the affected records;

acquire, using the computer, individual record-level locks on each affected AIX record;

hold, using the computer, the individual record-level locks on each of the affected AIX records only during updating of the affected AIX records; and update, using the computer, each of the affected AIX records according to the update after acquiring the individual record-level locks on each of the affected AIX records, wherein the affected AIX records are updated in parallel with updating of unaffected AIX records, and wherein the individual record-level locks on each of the affected AIX records each include a resource name comprising a x '16' byte key value hash.

11. The computer program product as recited in claim 10, wherein the file system is a virtual storage access method (VSAM) system, and wherein the AIX is defined over at least one of a key sequenced data set (KSDS) and an entry sequenced data set (ESDS).

12. The computer program product as recited in claim 10, with the proviso that an upgrade lock is not acquired for all of the AIX records for the base data set.

13. The computer program product as recited in claim 10, wherein a key sequenced data set (KSDS) provides an index for the base data set, and wherein the KSDS is keyed to a different field of the base data set than the AIX.

14. The computer program product as recited in claim 10, wherein the program instructions are configured to cause the computer to relinquish the individual record-level locks on the affected AIX records after updating the affected AIX records, wherein the affected AIX records are updated in parallel with updating of unaffected AIX records.

15. The computer program product as recited in claim 10, wherein the program instructions are configured to cause the computer to relinquish a first record-level lock on a first affected AIX record after updating the first affected AIX record.

16. The computer program product as recited in claim 10, wherein the program instructions are configured to cause the computer to hold record-level locks on affected AIX records only during updating of the affected AIX records.

17. The computer program product as recited in claim 11, wherein the program instructions are configured to cause the computer to:

acquire a lock on the base data set prior to updating the base data set;

acquire a lock on the ESDS or the KSDS for the base data set when the individual record-level locks are acquired on the affected AIX records; and serialize updates to the base data set with updates to the affected AIX records.

18. A system, comprising:

a processor and logic that is at least one of integrated and executable by the processor, the logic being configured to cause the processor to perform a method comprising:

receiving a request to perform an update on a base data set in a record-oriented file system, wherein one or more affected records within the base data set are modified by the update;

locating affected alternate index (AIX) records corresponding to the affected records;

acquiring individual record-level locks on each affected AIX record;

holding the individual record-level locks on each of the affected AIX records only during updating of the affected AIX records; and updating each of the affected AIX records according to the update after acquiring the individual record-level locks on each of the affected AIX records, wherein the affected AIX records are updated in parallel with updating of unaffected AIX records, and wherein the individual record-level locks on each of the affected AIX records each include a resource name comprising a x '16' byte key value hash.

19. The system as recited in claim 18, wherein the file system is a virtual storage access method (VSAM) system, and wherein the AIX is defined over at least one of a key sequenced data set (KSDS) and an entry sequenced data set (ESDS).

* * * * *